US012737161B1

(12) United States Patent
Jones

(10) Patent No.: US 12,737,161 B1
(45) Date of Patent: Sep. 15, 2026

(54) ROBOTIC PROCESS AUTOMATION ACCELERATION AND CONTROL

(71) Applicant: THE HUNTINGTON NATIONAL BANK, Columbus, OH (US)

(72) Inventor: Carolyn Jones, Columbus, OH (US)

(73) Assignee: The Huntington National Bank, Columbus, OH (US)

(*) Notice: Subject to any disclaimer, the term of this patent is extended or adjusted under 35 U.S.C. 154(b) by 0 days.

(21) Appl. No.: 19/416,320

(22) Filed: Dec. 11, 2025

(51) Int. Cl.
*G06F 8/35* (2018.01)
*G06N 20/00* (2019.01)

(52) U.S. Cl.
CPC ............... *G06F 8/35* (2013.01); *G06N 20/00* (2019.01)

(58) Field of Classification Search
CPC .................................. G06F 8/35; G06N 20/00
USPC .......................................................... 717/104
See application file for complete search history.

(56) References Cited

U.S. PATENT DOCUMENTS

| | | | | |
|---|---|---|---|---|
| 12,347,014 | B2 * | 7/2025 | Yuan | G06V 20/64 |
| 2021/0252698 | A1 * | 8/2021 | Paxton | G05D 1/0088 |
| 2022/0138004 | A1 * | 5/2022 | Nandakumar | G06N 5/01 718/102 |
| 2022/0144304 | A1 * | 5/2022 | Ehsanibenafati | G01C 21/28 |
| 2023/0023382 | A1 * | 1/2023 | Mani | G06F 9/542 |
| 2023/0271330 | A1 * | 8/2023 | Sundaralingam | B25J 13/003 700/246 |
| 2024/0201973 | A1 * | 6/2024 | Johnson | G06F 9/5005 |

OTHER PUBLICATIONS

Hofmann, Peter, Caroline Samp, and Nils Urbach. "Robotic process automation." Electronic markets 30.1 (2020): pp. 99-106. (Year: 2020).*

Jimenez-Ramirez, Andres, et al. "A method to improve the early stages of the robotic process automation lifecycle." International Conference on Advanced Information Systems Engineering. Cham: Springer International Publishing, 2019. pp. 446-461. (Year: 2019).*

(Continued)

*Primary Examiner* — Satish Rampuria
(74) *Attorney, Agent, or Firm* — Kilpatrick Townsend & Stockton LLP

(57) ABSTRACT

Systems, methods, and non-transitory, computer-readable media may facilitate robotic process automation acceleration and control. Automation data, received via a network interface, may be associated with operations of an automation pipeline for developing and deploying units of automation to a computing infrastructure. Automation composites may be created and may include the automation data associated with the operations. Rules corresponding to automation development protocols may be learned using the automation composites. The rules may define mappings of the automation composites to requirements pertaining to automation development operations. Templates may be developed based on the rules. The templates may include the rules and corresponding requirements. A set of objects may be generated based on the templates. The set of objects may facilitate setup of a unit of automation based on the learning. The set of objects may be stored in association with the automation pipeline, facilitating development of the unit of automation.

20 Claims, 6 Drawing Sheets

(56) References Cited

OTHER PUBLICATIONS

Chakraborti, Tathagata, et al. "From Robotic Process Automation to Intelligent Process Automation:—Emerging Trends—." International Conference on Business Process Management. Cham: Springer International Publishing, 2020. pp. 215-228. (Year: 2020).*

Afrin, Sadia, Shobnom Roksana, and Riad Akram. "AI-enhanced robotic process automation: A review of intelligent automation innovations." IEEE access 13 (2024): pp. 173-197. (Year: 2024).*

Le Clair, Craig, A. Cullen, and M. King. "The forrester wave™: Robotic process automation, q1 2017." Forrester Research 770 (2017). pp. 1-24. (Year: 2017).*

Kotla, Praneetha. "Accelerating Shared Services with UiPath: Lessons from Early Automation Centres of Excellence (CoEs)." Available at SSRN 5379367 (2022). pp. 27-39. (Year: 2022).*

* cited by examiner

CLOUD INFRASTRUCTURE SYSTEM
130-1

INFRASTRUCTURE RESOURCES
132

CLOUD SERVICES
134

102

102-1

102-2

102-3

102-n

NETWORK(S)
110

130

112

112-1

112-2

112-n

114

114-n

140

112-5

112-6

600
Computer-Program Product
Instruction Set #1
Instruction Set #2
Instruction Set #3
Computer-Readable Medium
605
606
Monitor
655
660
680
602
Processor(s)
Random Access Memory
Non-Volatile Storage Drive
660
Communication Network
Communication Interface
Input Device(s)
Output Devices
650
640
630

ROBOTIC PROCESS AUTOMATION ACCELERATION AND CONTROL

TECHNICAL FIELD

This disclosure generally relates to computers systems management and more particularly to systems, methods, and non-transitory, computer-readable media to facilitate robotic process automation acceleration and control.

BACKGROUND

In large-scale, multi-user computer systems, various users and teams may create bots to perform tasks (e.g., repetitive tasks) with robotic process automation (RPA) technology. Typically, such users and teams simply start creating the bots with no framework and process in place that accelerate the creation with the right fundamentals, estimations of resource output, documentation, and bot support. Even with a cumbersome and inefficient bot creation process, a large-scale, multi-user computer system may eventually have numerous bots up and running with no or insufficient documentation, and no way to effectively support, score, and improve the bots.

Thus, there is a need for systems, methods, and non-transitory, computer-readable media that systematically address such challenges. These and other needs are addressed by the present disclosure.

BRIEF SUMMARY

Certain embodiments according to the present disclosure relate generally to computers systems management and more particularly to systems, methods, and non-transitory, computer-readable media to facilitate robotic process automation acceleration and control.

In one aspect, a system may facilitate robotic process automation acceleration. The system may include one or more processing devices and memory communicatively coupled with and readable by the one or more processing devices. The memory may include processor-readable instructions which, when executed by the one or more processing devices, cause the system to perform one or a combination of the following operations. Automation data may be received via a network interface. The automation data may be associated with operations of an automation pipeline for developing and deploying one or more units of automation to a computing infrastructure. Automation composites may be created. Each of the automation composites may include at least some of the automation data associated with the operations of the automation pipeline. The automation composites may be stored in a data storage. Rules corresponding to one or more automation development protocols may be learned using the automation composites. The rules may define mappings of the automation composites to requirements pertaining to automation development operations of the automation pipeline. One or more templates may be developed based at least in part on the rules. The one or more templates may include one or more of the rules and corresponding requirements. A set of objects may be generated based at least in part on the one or more templates. The set of objects may facilitate setup of a unit of automation based at least in part on the learning. The set of objects may be stored in association with the automation pipeline, facilitating development of the unit of automation.

In another aspect, a method may facilitate robotic process automation acceleration. The method may include one or a combination of the following. Automation data may be received via a network interface. The automation data may be associated with operations of an automation pipeline for developing and deploying one or more units of automation to a computing infrastructure. Automation composites may be created. Each of the automation composites may include at least some of the automation data associated with the operations of the automation pipeline. The automation composites may be stored in a data storage. Rules corresponding to one or more automation development protocols may be learned using the automation composites. The rules may define mappings of the automation composites to requirements pertaining to automation development operations of the automation pipeline. One or more templates may be developed based at least in part on the rules. The one or more templates may include one or more of the rules and corresponding requirements. A set of objects may be generated based at least in part on the one or more templates. The set of objects may facilitate setup of a unit of automation based at least in part on the learning. The set of objects may be stored in association with the automation pipeline, facilitating development of the unit of automation.

In yet another aspect, one or more non-transitory, machine-readable media having machine-readable instructions thereon which, when executed by one or more processing devices, may cause a system to perform one or a combination of the following operations. Automation data may be received via a network interface. The automation data may be associated with operations of an automation pipeline for developing and deploying one or more units of automation to a computing infrastructure. Automation composites may be created. Each of the automation composites may include at least some of the automation data associated with the operations of the automation pipeline. The automation composites may be stored in a data storage. Rules corresponding to one or more automation development protocols may be learned using the automation composites. The rules may define mappings of the automation composites to requirements pertaining to automation development operations of the automation pipeline. One or more templates may be developed based at least in part on the rules. The one or more templates may include one or more of the rules and corresponding requirements. A set of objects may be generated based at least in part on the one or more templates. The set of objects may facilitate setup of a unit of automation based at least in part on the learning. The set of objects may be stored in association with the automation pipeline, facilitating development of the unit of automation.

In various embodiments, one or more data structures in the data storage may be populated with automation specifications specifying automation attributes corresponding to a plurality of automation types. At least part of the automation data may be matched to a particular automation type of the plurality of automation types. The rules may be at least partially a function of the particular automation type. In various embodiments, the one or more templates may be configured for the particular automation type.

In various embodiments, the one or more templates may specify automation attributes determined based at least in part on the automation data. In various embodiments, the operations of the automation pipeline may be monitored via the network interface. The monitored operations may correspond at least in part to a set of input requirements for the developing and the deploying of the one or more units of automation. The one or more units of automation may correspond to one or more scripts for execution by one or more components of the computing infrastructure. In various embodiments, the receiving the automation data via the network interface may be based at least in part on the monitoring. In various embodiments, the operations of the automation pipeline may be analyzed to identify the automation data associated with one or more operations of the automation pipeline.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
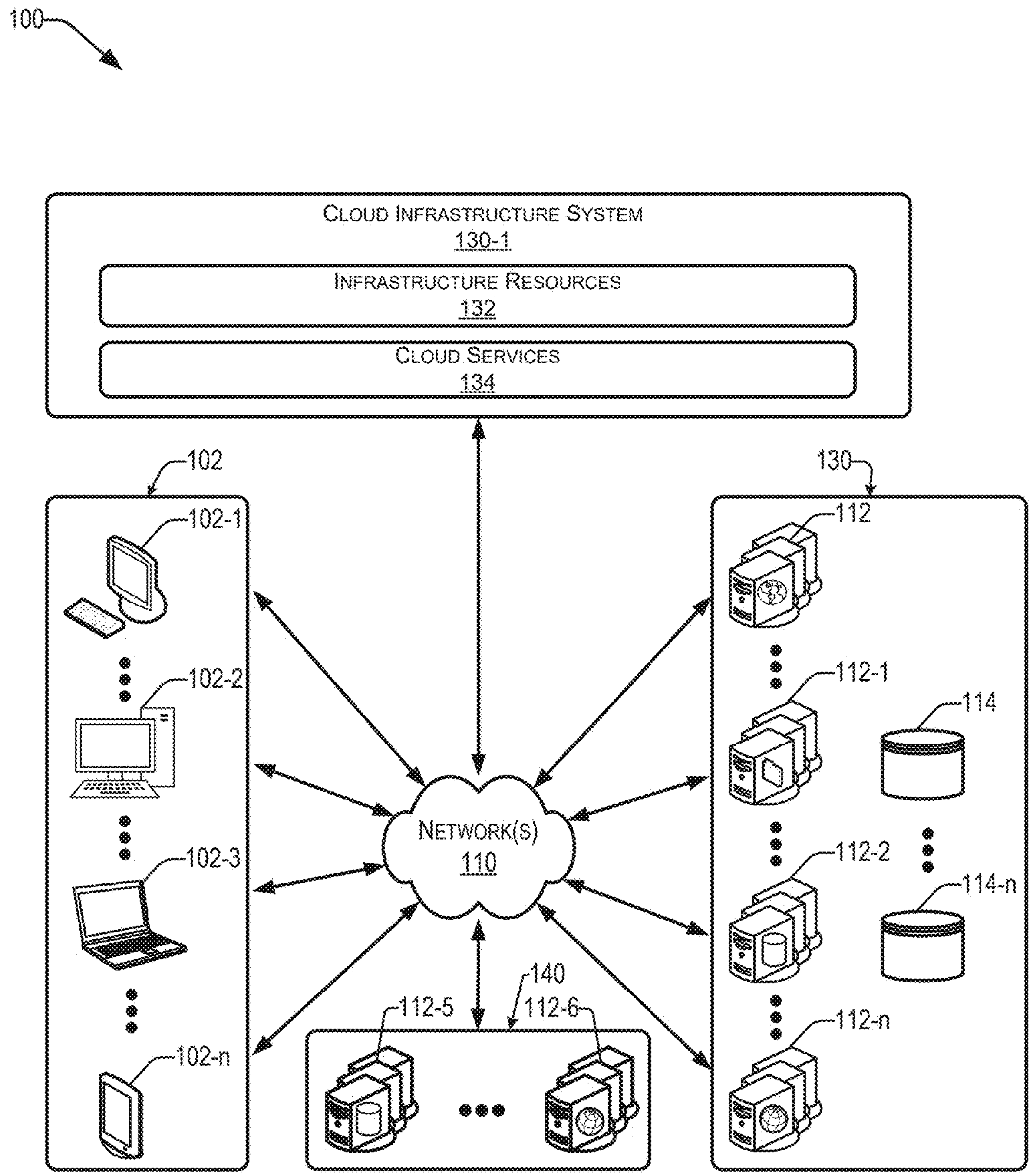
FIG. 1 illustrates computing infrastructure for implementing disclosed embodiments, in accordance with embodiments according to the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment (s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

As disclosed herein, embodiments according to the present disclosure provide technological solutions to multiple problems existing with conventional systems and approaches. The technical improvements provided by disclosed embodiments over prior technologies include improvements in accelerating and control of robotic process automation (RPA). A significant challenge in RPA development lies in the manual, time-intensive processes required to create and refine automation processes. Traditional systems lack integrated mechanisms to streamline the processes, including generation of automation rules, templates, and configuration objects, leading to redundant efforts, inconsistencies, and delays in deployment. For instance, developers often face difficulties in aligning automation tasks with compliance standards or performance benchmarks due to the absence of dynamic, data-driven rule creation. Additionally, the absence of centralized storage and reuse of automation composites—such as task-specific metadata, scripts, or configuration files—results in fragmented methods and increased development overhead.

Embodiments according to the present disclosure may address these challenges through a novel method and system that accelerates RPA pipeline operations. By leveraging automation composites, the system may decompose complex automation tasks into reusable components, which may be stored in a centralized data repository. This may enable rapid retrieval and repurposing of existing composites, reducing redundant work and ensuring consistency across automation units. Furthermore, the system may dynamically learn rules based on automation development protocols, automatically mapping composites to compliance requirements, performance metrics, or integration standards. These learned rules may then used to generate templates tailored to specific automation types, such as configuration files, scripts, or process diagrams. This may eliminate the need for manual template creation and ensure alignment with entity protocols.

Another critical limitation in existing RPA systems is the lack of real-time monitoring and adaptive improvements to automation pipelines. Embodiments according to the present disclosure may provide for a monitoring mechanism that tracks pipeline operations, identifies input requirements, and extracts additional automation data for continuous refinement. This data may be used to update automation composites and rules, ensuring that templates and generated objects remain aligned with evolving methods and compliance standards. By integrating these features, the system may significantly reduce development cycles, minimize human intervention, and enhance the scalability and adaptability of RPA implementations.

Traditional RPA systems and frameworks suffer from several technical shortcomings, including inefficient manual configuration of automation components, lack of adaptive learning for process optimization, and fragmented storage of automation metadata and scripts. These limitations result in high developer workload, inconsistent process documentation, and suboptimal pipeline reliability. Disclosed embodiments address these technical problems by providing a system and method for automated generation and reuse of automation composites, which may be structured data objects encapsulating metadata, code, and configuration parameters for specific automation tasks. Disclosed embodiments may further incorporate a machine learning-based engine capable of dynamically generating and updating rules and templates that govern automation development protocols. By integrating real-time monitoring of pipeline operations and historical deployment data, disclosed embodiments may enable adaptive, self-optimizing automation pipelines that significantly reduce manual input, increase reliability, and ensure compliance with evolving technical and regulatory standards. This technical solution goes beyond conventional RPA platforms at least in part by introducing mechanisms for continuous learning and predictive analytics, thereby improving the underlying functionality of computer systems used for process automation.

The technical architecture underpinning disclosed embodiments may include a multi-tiered system including client computing devices, server systems, and cloud infrastructure, all interconnected via secure network interfaces. Automation composites may be stored in a key-value database structure, enabling efficient retrieval and reuse of metadata, code fragments, and configuration parameters. A machine learning engine may utilize a combination of supervised and unsupervised learning algorithms, such as decision trees and neural networks, to analyze pipeline event logs, deployment outcomes, and user input patterns. Real-time monitoring may be facilitated by event listeners and API endpoints that capture pipeline state changes, error logs, and resource utilization metrics. Data validation routines may be implemented to ensure integrity and security of automation composites and user-provided input, with role-based access controls restricting modification rights to authorized personnel. The system's scalability may be achieved through distributed processing across server clusters and cloud resources, with dynamic allocation of computing power based on pipeline workload and historical resource usage patterns. These technical implementation details distinguish the disclosed embodiments from generic computer functions and demonstrate how the disclosed system improves the operation and reliability of automation pipelines at a fundamental technical level.

Various embodiments will now be disclosed in greater detail with reference to the accompanying drawings, beginning with FIG. 1.

FIG. 1 depicts a simplified diagram of computing infrastructure 100 for implementing disclosed embodiments in accordance with present disclosure. The selection and/or arrangement of components depicted in FIG. 1 are shown only by way of example and are not meant to be limiting. As in the illustrated embodiment, the computing infrastructure 100 (which may be referenced as "system 100" herein) may correspond to a system that includes one or more client computing devices 102, which may be configured to execute and operate a variety of applications, which may include, for example, a client application such as a web browser, proprietary client, or the like over one or more networks 110, which may include one or more internal networks and/or one or more external networks.

In some embodiments, the computing infrastructure 100 may include a server system 130, which may be on premises and/or remote from the client computing devices 102. The server system 130 may include one or more servers 112. The servers 112 may be communicatively coupled with the remote client computing devices 102 via the one or more networks 110. In various embodiments, the servers 112 may be adapted to run one or more services or software applications provided by one or more of the components of the computing infrastructure 100.

Software components may be implemented on one or more of the servers 112 and/or the client computing devices 102. Users operating the client computing devices 102 may utilize one or more client applications to use the services provided by components of the computing infrastructure 100. Various components of the computing infrastructure 100 may be implemented in hardware, firmware, software, or combinations thereof. It should be appreciated that various system configurations are possible, which may be different from the example of the computing infrastructure 100. The embodiment shown in the figure is thus one example of a computing infrastructure 100 for implementing embodiments according to the present disclosure and is not intended to be limiting.

The client computing devices 102 may be portable handheld devices (e.g., a smartphone, a touchscreen tablet computer, a personal digital assistant or wearable devices), running software such as a variety of mobile operating systems such as iOS, Windows Phone, Android, and the like, and being Internet, e-mail, short message service (SMS), or other communication protocol enabled. Alternatively, or in addition, the client computing devices 102 may be general-purpose personal computers including, by way of example, personal computers and/or laptop computers running various operating systems. Alternatively, or in addition, the client computing devices 102 may be workstation computers running any of a variety of operating systems. Alternatively, or in addition, the client computing devices 102 may be any other electronic device, such as a thin-client computer, and/or a personal messaging device, capable of communicating over the network(s) 110. Although a number of the client computing devices 102 is illustrated, any number of client computing devices 102 may be supported.

The network(s) 110 may be any type of network or combination of types of networks familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 110 may be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks. Various components of the computing infrastructure 100 may include various network interfaces to facilitate communications between the client computing devices 102, one or more server systems 130, one or more remote systems 140, and/or a cloud infrastructure system 130-1. In some embodiments, some of the interfaces may include or otherwise correspond to API interfaces to transmit to and/or receive communications from one or a combination of the components of the computing infrastructure 100 using APIs.

Each server 112 may be composed of one or more general-purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, one or more servers 112 may be adapted to run one or more services or software applications described in the present disclosure. For example, one or more servers 112 may correspond to a server for performing processing described above according to an embodiment of the present disclosure.

Each server 112 may run an operating system, including any available server operating system. Each server 112 may also run any of a variety of additional server applications and/or mid-tier applications, including HTTP servers, FTP (file transfer protocol) servers, CGI (common gateway interface) servers, JAVA® servers, database servers, and the like. In various embodiments, the servers 112 may include aggregation servers that share data with data storage servers via the one or more networks 110, which may include one or more internal networks. The data storage servers may be configured to store data and may include database servers, file storage servers, and other similar data storage servers. In various embodiments, the servers 112 may include interface servers that may provide one or more interfaces applications to interact with the other elements of the system 100. The interface servers may provide the one or more interfaces and communicate with the other elements of the system 100 via the one or more networks 110. The interfaces generated by the interface servers may be used by the client computing devices 102 to interact with elements of the system 100.

The computing infrastructure 100 may also include one or more databases 114. The databases 114 may reside in a variety of locations. By way of example, one or more of the databases 114 may reside on a non-transitory, storage medium local to (and/or resident in) one or more servers 112. Additionally or alternatively, one or more databases 114 may be remote from the servers 112 and in communication with the servers 112 via network-based or dedicated connection. In various embodiments, one or more databases 114 may reside in a storage-area network (SAN), NAS (Network Attached Storage), or cloud storage capabilities, such as block, file, or object storage. Similarly, any necessary files for performing the functions attributed to the servers 112 may be stored locally on the servers 112 and/or remotely, as appropriate. In one set of embodiments, the databases 114 may include relational databases that are adapted to store, update, and retrieve data in response to SQL-formatted commands.

The computing infrastructure 100 may include a cloud infrastructure system 130-1 that may be configured to provide infrastructure resources 132 and cloud services 134 made available to the client computing devices 102 via the one or more networks 110, which may include the Internet. The cloud infrastructure system 130-1 may include a server system, such as the server system 130. Although illustrated separately, in some embodiments, the cloud infrastructure 130-1 may include the server system 130 and provide cloud services to the client computing devices 102. In some embodiments, the cloud infrastructure 130-1 may include a version of the server system 130 and provide cloud services to the client computing devices 102, while the client computing devices 102 may additionally use the resources of the server system 130 such that the server system 130 may be on premises or remote with respect to the client computing device is 102. Accordingly, in various embodiments, resources may be provided to the client computing devices 102 by on-premises server system, remote server system, and/or cloud services.

The cloud infrastructure system 130-1 may include infrastructure resources 132 for providing the resources used to provide various services to clients. In various embodiments, the cloud services 134 provided by the cloud infrastructure system 130-1 may include a host of services that are made available to the client computing devices 102 on demand, such as online data storage and backup solutions, hosted office suites and document collaboration services, database processing, managed technical support services, and the like. The cloud services 134 may include infrastructure services that facilitate the management and control of the underlying computing resources, such as storage, networks, and other fundamental computing resources for clients. The cloud-provisioned resources may include resources shared by multiple users and dynamically re-allocated per demand, and pre-integrated and optimized combinations of hardware, such as servers, storage, and networking resources to execute services.

In various embodiments, the cloud services may include one or more services of various types such as Infrastructure as a Service (IaaS), Database as a Service (DbaaS), Platform as a Service (PaaS), Software as a Service (SaaS), and/or other services including hybrid services. The underlying software and infrastructure for providing the clouds services may be managed and controlled by the cloud infrastructure system 130-1. In some examples, a cloud service may include protected computer network access to remote storage on the cloud through the Internet, a hosted database, a hosted web server, a software application, database cloud services, middleware cloud services, and Java cloud services, and/or the like. For example, a cloud service may include a web-based service, a web service-based hosted, a script-language middleware engine for use by a networked developer, and/or the like.

In some implementations, the computing infrastructure 100 may also include the one or more remote service provider systems 140 (also referenced herein as remote systems 140), each of which may be communicatively couplable with the client computing devices 102 via the networks 110. The remote systems 140 may provide services that provide automation data supporting bot monitoring features disclosed herein. In some implementations, the one or more remote systems 140 may be, include, or otherwise correspond to one or more bot-monitoring systems that may be configured to monitor units of automation created by components of the infrastructure 100. In various embodiments, in addition or alternative, the bot-monitoring may be performed by the server system 130 and/or the cloud infrastructure system 130-1 such that one or a combination of the one or more remote systems 140, the server system 130, and/or the cloud infrastructure system 130-1 may perform the bot monitoring and may be bot-monitoring systems.

A bot may include one or more units of automation. Thus, as used herein, a unit of automation may refer to a bot or a component of a bot. In various embodiments, the bot monitoring of units of automation may be based at least in part on one or a combination of monitoring software installed on one or more servers of the server system 130 and/or the cloud infrastructure system 130-1, one or more APIs that define protocols and routines for interfacing with the automation data sources with calls to/from the automation data sources via an API interface, and/or the like. In various embodiments, Secure Shell (SSH), Telnet, Simple Network Management Protocol ("SNMP"), and/or any other suitable protocol may be used to facilitate communications between the bot-monitoring system(s) and other components of the infrastructure. By way of example, to gather automation data, the bot-monitoring system may run one or more scripts, select one or more servers, establish one or more communication pipes to the one or more servers, log into the one or more servers for command line access via a transport layer by, for example, IP address and any suitable protocol, and pull automation data from the one or more servers. Other embodiments are possible.

In some embodiments, the computing infrastructure 100 may facilitate a production computing service to deploy automation via a continuous deployment pipeline. A developer, using a client computing device 102, may interact with the computing infrastructure 100 by requesting one or more services provided by the computing infrastructure 100. In some embodiments, the developer may access a cloud user interface. Automation pipeline services provided by the computing infrastructure 100 may include virtual machine instances for the developers to use, in some embodiments.

In various embodiments, the server system 130 and/or the one or more remote systems 140 may include one or more automation services servers, one or more data management servers configured to manage automation pipeline services data and the one or more databases 114 (which may store pipeline services data), and/or the like. The one or more pipeline services servers may be configured to provide automation deployment pipeline services (e.g., to developers using the client computing devices 102) to facilitate automation production computing services. With the automation pipeline services provided, developers may provision, launch, and manage automation in the cloud.

In some embodiments, one or more of the servers 112 may include one or more applications to analyze and consolidate automation data feeds and/or automation event updates received from one or more units of automation of the infrastructure 100. For example, automation data feeds and/or automation event updates may include, but are not limited to, real-time automation data updates generated by units of automation. One or more of the servers 112 may also include one or more applications to display graphical representations of the automation data feeds and/or automations real-time events via one or more display devices of the client computing devices 102 and to provide access to the results generated by the automations (e.g., documents, files, images, screen scrapes, and/or other types of data generated by the automation).

By way of example, a bot may be configured to log into a system, navigate to particular screens, interrogate what is on the screens, and update components of the interfaces, interacting with the screens, interface elements, and data fields. This may include the bot logging into, for example, ten to fifteen different systems, pulling resource data, aggregating the resource data, and organizing the resource data for exposure to a user. As part of that automated process, the bot may also filter the resource data for particular data attributes (e.g., process exceptions) and communicate the filtered and organized resource data to particular users.

Figure 2:
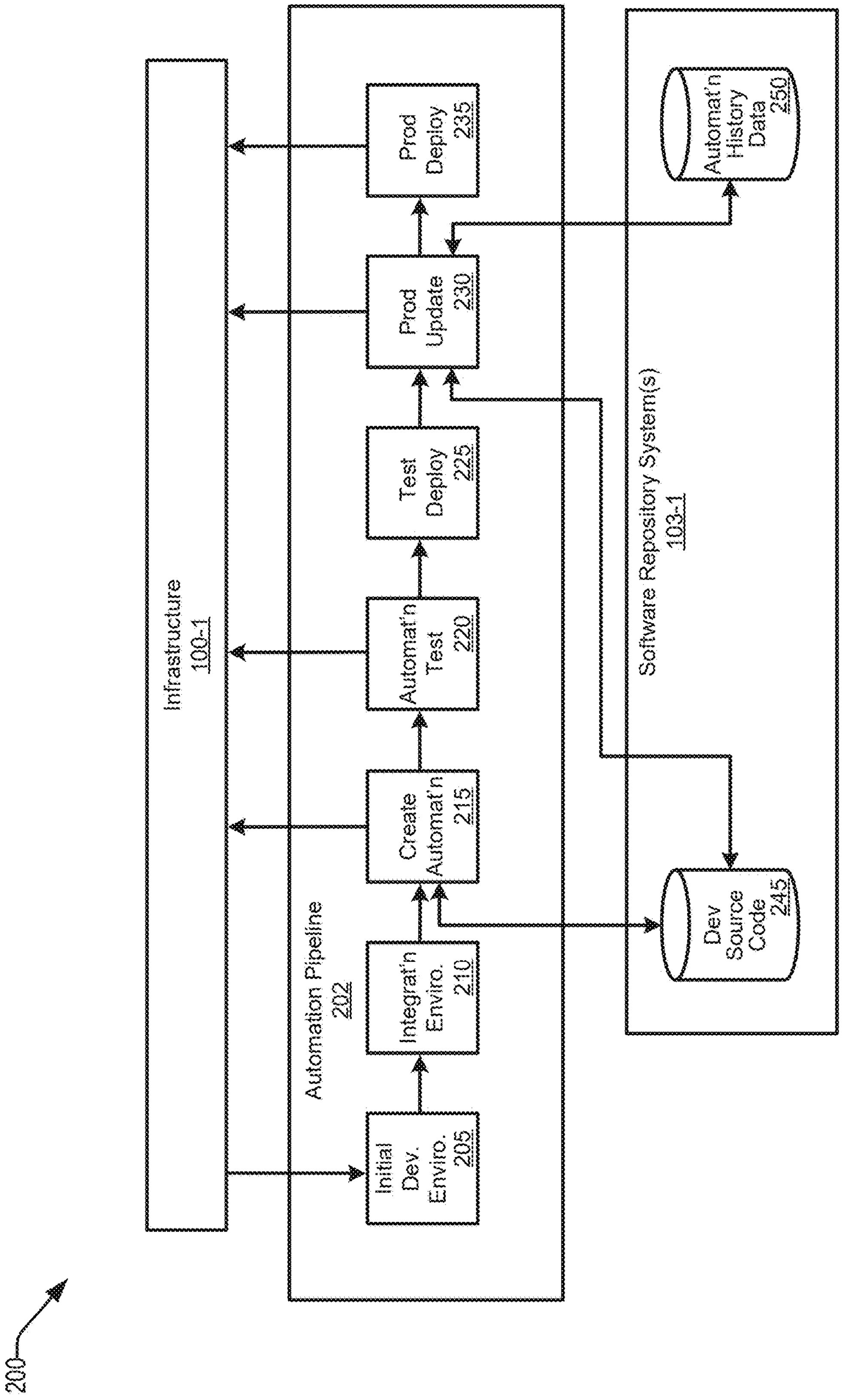
FIG. 2 illustrates a functional diagram of one example automation pipeline system 200 to facilitate automation pipeline services, in accordance with embodiments according to the present disclosure.

The automation pipeline services provided by the infrastructure 100 may be structured in stages and may facilitate building, testing, and releasing automation to production services. FIG. 2 illustrates a functional diagram of one example automation pipeline system 200 to facilitate automation pipeline services, in accordance with embodiments of the present disclosure. The automation pipeline system 200 may include one or a combination of components of the infrastructure 100-1, an automation pipeline 202 for developing and deploying one or more units of automation to the infrastructure 100-1, and one or more software repository systems 103. In various embodiments, the one or more software repository systems 103 may correspond to the data storage of the infrastructure 100, the one or more databases 114, and/or one or more remote systems 140.

The automation pipeline 202 may be configured to operate in accordance with an automation flow to facilitate automation services. The automation pipeline 202 may be a custom pipeline that automates bot development and deployment with minimal input, low information needed, and low friction. In some embodiments, the automation development and deployment flow may operate according to the operational flow diagram depicted in the example of FIG. 2, exposing various aspects of the pipeline to developers via any suitable graphical user interface. The example automation development and deployment flow may illustrate deployment stages of the automation pipeline 202, through at least some of which units of automation may progress.

In some embodiments, the automation services may include automation pipeline deployment agents of the infrastructure 100-1 that may include software applications for automation of automation development and deployment through various stages to production services corresponding to a production deployment 240. Such automation of automation development and deployment may include continuously integrating software, configuration states, scripts, artifacts, and/or the like into production services corresponding to production deployment 240. The automation pipeline deployment agents may facilitate the automation development and deployment pipeline in stages that may include preproduction stages, where the developed units of automation may be automatically tested. The stages may further include deployment integration testing with the units of automation deployed in a preproduction environment, which may allow for testing with systems, subsystems, and data that may correspond to the actual systems, subsystems, and data with which units of automation may interact in the production environment. In various embodiments, such preproduction stages and/or deployment integration stages may include an initial development environment 205, an integration environment 210, an automation creation stage 215, an automation testing update stage 220, a deployment testing stage 225, an automation production update stage 230, and/or other alpha, beta, and/or gamma testing stages. Once gamma testing is successfully completed and validated, the software may be pushed to production with the production stage 235. In some embodiments, this may involve the pipeline deployment agents partially, incrementally, and/or fully deploying the software to production service.

In some embodiments, with one or more of the preproduction stages, the pipeline deployment agents may build executables of the units of execution (e.g., bots) from a source code repository 245, which may store the units of execution provided in part by the developers. The pipeline deployment agents may run automated tests on the executables and monitor the tests to identify correct functioning, errors, conflicts, performance metrics, etc. as the executables progress toward production deployment 235. Upon successful testing and validations, the pipeline deployment agents may advance the executables to toward production deployment 235. However, when incorrect functioning, errors, conflicts, failures to satisfy performance metrics threshold, and or the like are identified, the pipeline deployment agents may roll back the executables to a prior version and/or stage, and may notify the developers of pertinent log data, test results, reports, and/or the like regarding the unsuccessful testing and/or validations.

As illustrated, a unit of automation may be introduced after a developer triggers automation deployment into the development environment 205 and the integration environment 210. After deployment to the integration environment 210, but before deployment to the deployment testing stage 225, a unit of automation may be created at the automation creation stage 215. The automation creation may be triggered automatically after a successful integration deployment.

In some examples according to embodiments disclosed herein, a developer may access the automation pipeline system via a graphical user interface to initiate creation of a new automation bot for processing applications (e.g., loan application in a banking environment). The system (e.g., subsystem 400 described herein) may monitor the developer's minimal input—such as selection of the automation type and configuration parameters—and may automatically retrieve relevant automation composites from a centralized data repository. Machine learning algorithms may analyze historical deployment data to identify optimal configuration settings and compliance requirements for similar bots previously deployed. The system may generate a customized template containing pre-populated fields and validation rules, minimizing manual user input. Once the template is confirmed by the developer, the system may automatically generate setup objects and scripts, which may be deployed to a cloud infrastructure for integration testing and production release. If a deployment error or compliance issue is detected during testing, the system may proactively update the template and setup objects, notify the developer of the recommended corrective actions, and log the incident for future learning. Such examples may illustrate how disclosed embodiments may enable rapid, adaptive creation and deployment of automation bots, leveraging historical data and real-time monitoring to ensure reliability and compliance.

Figure 3:
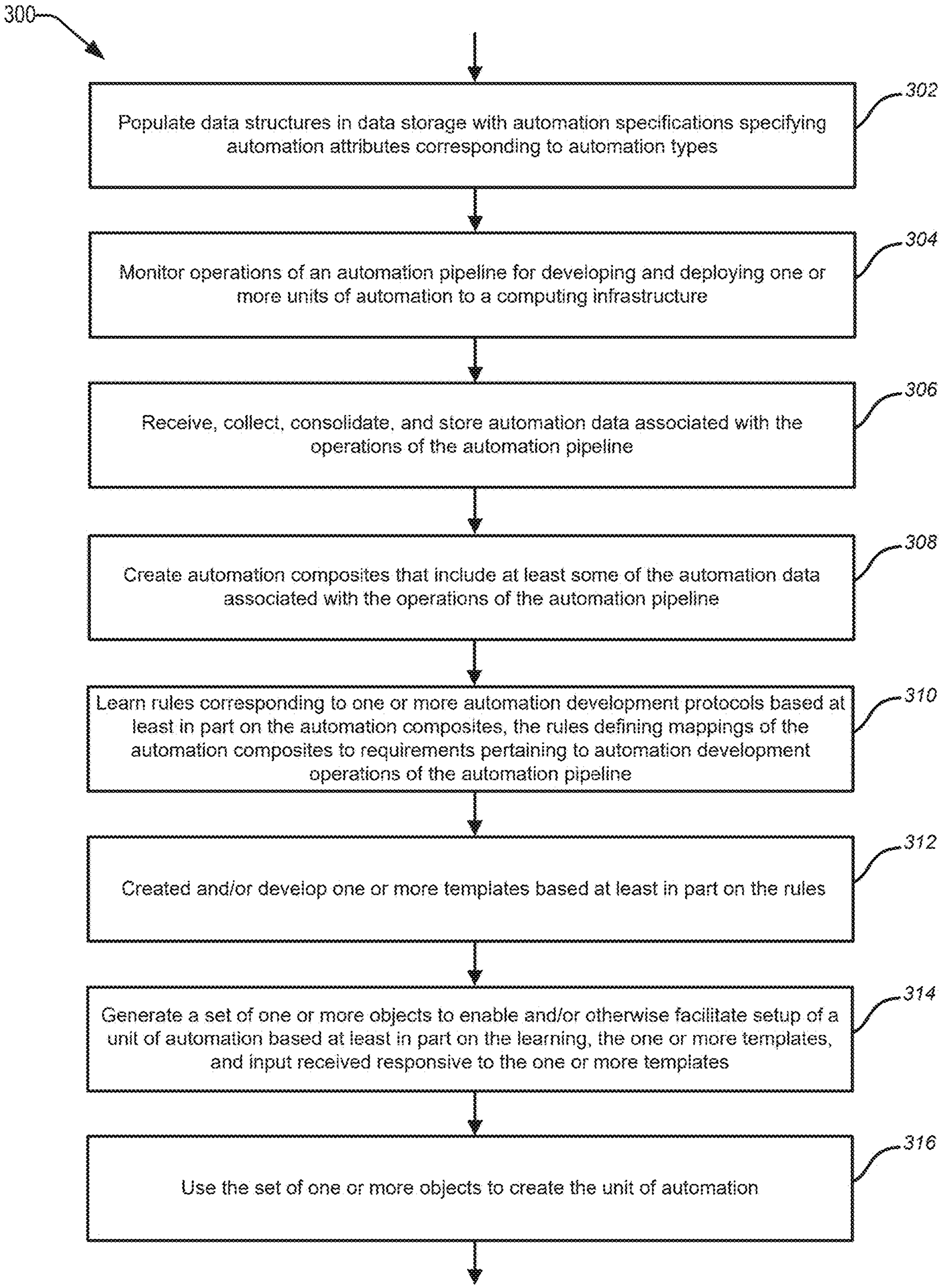
FIG. 3 illustrates an example method an example method to facilitate robotic process automation acceleration and control, in accordance with embodiments according to the present disclosure.

FIG. 3 depicts an example method 300 to facilitate robotic process automation acceleration and control, in accordance with embodiments according to the present disclosure. However, teachings of the present disclosure may be implemented in a variety of configurations. As such, the order of the steps comprising the method 300 and/or other methods disclosed herein may be shuffled or combined in any suitable manner and may depend on the implementation chosen. Moreover, while the following steps may be separated for the sake of description, it should be understood that certain steps may be performed simultaneously or substantially simultaneously.

The method 300 may correspond to some aspects of facilitating robotic process automation acceleration and control with systems disclosed herein (e.g., subsystem 400 described herein). While such aspects are provided for the sake of description, further aspects and details are provided with the following. As indicated by block 302, in some embodiments, one or more data structures in a data storage (e.g., tables in a database system corresponding to databases 114) may be populated (e.g., prepopulated) by the infrastructure 100 with automation specifications specifying automation attributes corresponding to a plurality of automation types. As indicated by block 304, in some embodiments, operations of an automation pipeline for developing and deploying one or more units of automation to a computing infrastructure may be monitored by the infrastructure 100 via a network interface. The monitored operations may correspond at least in part to a set of input requirements for the developing and the deploying of the one or more units of automation. The one or more units of automation may correspond to one or more scripts for execution by one or more components of the computing infrastructure 100.

As indicated by block 306, automation data may be received by the infrastructure 100 via the network interface. In some embodiments, the automation data may be received based at least in part on the monitoring. In some embodiments, the infrastructure 100 may analyze the operations of the automation pipeline to identify the automation data associated with one or more operations of the automation pipeline.

The automation data may be associated with the operations of the automation pipeline. The automation data may include, for example, user input, pipeline operations data, and/or data source input. The automation data may be collected, consolidated, and stored in a data storage. In some embodiments, the automation data may include information indicative of an automation structure that the infrastructure 100 may determine by analyzing the automation data. The information indicative of the automation structure may be processed. In some embodiments, the infrastructure 100 may match at least part of the automation data to a particular automation type of the plurality of automation types.

As indicated by block 308, in some embodiments, automation composites that include at least some of the automation data associated with the operations of the automation pipeline may be created by the infrastructure 100. Each automation composite may include at least some of the automation data may be associated with the operations of the automation pipeline. The automation composites may be collected and stored in a data storage of the infrastructure 100. As indicated by block 310, in some embodiments, based at least in part on the automation composites, rules corresponding to one or more automation development protocols may be learned by the infrastructure 100. In some embodiments, the rules may define mappings of the automation composites to requirements pertaining to automation development operations of the automation pipeline. In some embodiments, the rules may be at least partially a function of the particular automation type.

As indicated by block 312, in some embodiments, based at least in part on the rules, one or more templates may be created and/or developed. The one or more templates may include, for example, one or more of the rules and corresponding requirements specified for a unit of automation according to the automation composites. In some embodiments, the one or more templates may be configured for the particular automation type. In some embodiments, the infrastructure 100 may generate a pre-automation analysis based at least in part on the automation data and/or automation composites. In some embodiments, based at least in part on the pre-automation analysis, the infrastructure 100 may generate an automation plan that defines automation attributes for one or more automation scripts that may be generated and/or reused by the infrastructure 100 automatically or semi-automatically with user input responsive to the one or more templates. In some embodiments, the one or more templates may specify automation attributes determined by the infrastructure 100 based at least in part on the automation data. In some embodiments, the specified automation attributes may be confirmed or modified by user input responsive to exposing the one or more templates via a user interface.

The information indicative of the automation structure may be correlated by the infrastructure 100 to at least a first set of automation attributes corresponding to a first automation type of the plurality of automation types. Based at least in part on the information indicative of the automation structure, rules corresponding to the first automation type may be identified, the rules defining requirements pertaining to creating the unit of automation of the first automation type. A first subset of automation attributes of the automation attributes may be selected based at least in part on the rules, the first subset of automation attributes specifying one or more automation options pertaining to the first automation type. Likewise, in different instances, the information may indicate at least a second set of automation attributes corresponding to a second automation type of the plurality of automation types, rules corresponding to the second automation type may be identified, and a second subset of automation attributes of the automation attributes may be selected.

As indicated by block 314, in some embodiments, a set of one or more objects (setup objects) to enable and/or otherwise facilitate setup of a unit of automation may be generated by the infrastructure 100 based at least in part on the learning, the one or more templates, and input received responsive to the one or more templates. Additionally or alternatively, a previously stored set of one or more objects may be identified by the infrastructure 100 as reusable to enable and/or otherwise facilitate setup of the unit of automation. As indicated by block 316, in some embodiments, the set of one or more objects may be used by the infrastructure 100 to create the unit of automation. The set of objects may be stored by the infrastructure 100 in association with the automation pipeline and used to enable and/or otherwise facilitate development of the unit of automation. In some embodiments, the set of objects may include the one or more automation scripts.

By way of example, the set of objects may include one or a combination of the following. In some embodiments, a first subset of one or more objects may correspond to a use case template configured to model a particular use case for a unit of automation specified by the input. In some embodiments, a second subset of one or more objects may correspond to a requirements template configured to specify requirements for the unit of automation. In some embodiments, a third subset of one or more objects may correspond to a design template configured to design the unit of automation according to the requirements for the unit of automation. In some embodiments, a fourth subset of one or more objects design template may correspond to one or more reusable objects configured with one or more scripts that are reusable in existing form or with modifications to constitute the unit of automation according to the design.

In some embodiments, the facilitating the development of the unit of automation may include decreasing input required for the development of the unit of automation based at least in part on the learning so that the input required for the development of the unit of automation conforms to a reduced set of input requirements based at least in part on the learning. This may include selecting a subset of input attributes from a set of input attributes, the set of input attributes specifying data fields pertaining to the software change request, and the subset of input attributes specifying a subset of data fields. Based at least in part on the subset of input attributes and the rules corresponding to the one or more automation development protocols, the set of objects may be generated to facilitate setup of the unit of automation, the set of objects corresponding at least in part to the automation composites. Input received via a user interface of the automation pipeline may be processed, the received input conforming to the reduced set of the input requirements. The set of objects may be populated at least in part with the automation composites. The unit of automation may be configured in accordance with an automation development protocol, using the populated set of objects.

Figure 4:
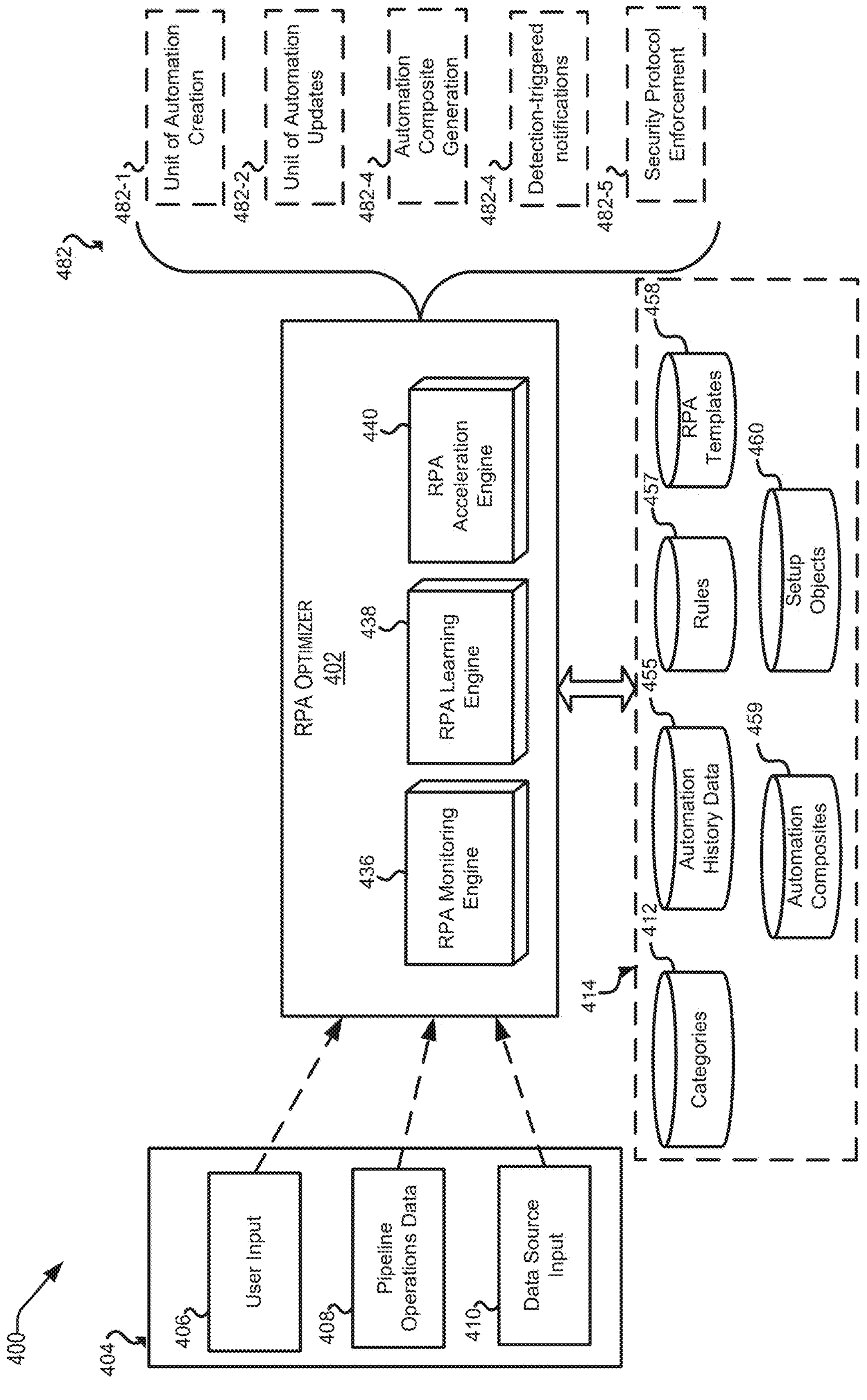
FIG. 4 illustrates a functional diagram for various embodiments of a robotic process automation (RPA) optimizer subsystem, in accordance with embodiments according to the present disclosure.

FIG. 4 illustrates a functional diagram for various embodiments of a robotic process automation (RPA) optimizer subsystem 400 ("subsystem 400"), in accordance with the present disclosure. The subsystem 400 may include one or more processors and one or more sets of memory, such as non-volatile memories. The processor(s) may include single or multicore processors. The processors may operate under the control of software stored in the associated one or more sets of memory. The one or more sets of memory may store instructions, that when executed by the one or more processors cause the subsystem 400 to perform one or more functions described herein.

The infrastructure 100 may include the subsystem 400. In various embodiments, the subsystem 400 may be facilitated by one or a combination of the client computing devices 102, the server system 130, and/or the cloud infrastructure system 130-1. For example, the subsystem 400 may include one or more client computing devices 102 using resources of the server system 130 and/or the cloud infrastructure system 130-1 to facilitate various features disclosed herein. While engines, repositories, and other components are described separately in this disclosure, it should be appreciated that the components may be combined and/or implemented differently in any combination to provide certain features in various embodiments with hardware, software and/or firmware. In various embodiments, different processes running on one or more shared resources may implement some of the components.

The subsystem 400 may be configured to accelerate RPA in conformance with learned automation development protocols. One end-result may correspond to utilizing minimal input to couple the rest of it with the automation deployment, instead of being high-manual-effort, high-back-and-forth process. This may allow for a high level of visibility with decreased manual effort.

The subsystem 400 may include an RPA optimizer 402 (which may be referenced herein as "bot optimizer 402" or "optimizer 402") and data storage 414. In various embodiments, the data storage 414 may correspond to the data storage of the infrastructure 100, the one or more databases 114, and/or one or more remote systems 140. In some embodiments, the optimizer 402 may correspond to an optimizer tool. The RPA optimizer 402 may be configured to monitor operations of the automation pipeline 202. The monitored operations may correspond at least in part to a set of input requirements for the developing and the deploying of one or more units of automation. The one or more units of automation may correspond to one or more scripts for execution by one or more components of the infrastructure 100.

In various embodiments, the RPA optimizer 402 may include one or more one or more RPA monitoring engines 436, one or more RPA learning engines 438, and/or one or more RPA acceleration engines 440. While the engines are shown separately, it should be appreciated that in various embodiments the engines may be combined or broken down further according to various features provided in various embodiments. The engines may be stored in memory and may include executable code and/or one or more software applications specially configured to provide the features disclosed herein, executable with one or more processors of the client computing devices 102, the server system 130, and/or the cloud infrastructure system 130-1 to provide the features disclosed herein. In various embodiments, the unit of execution optimizer 402 may correspond to one or a combination of the client computing devices 102, the server system 130, and/or the cloud infrastructure system 130-1 with a single, integral engine or separate engines working in conjunction. In some embodiments, one or more of the engines may correspond to one or more servers. The engines may be configured to perform any of the steps of methods described in the present disclosure.

The RPA optimizer 402 may be communicatively coupled with interface components and communication channels (which may take various forms in various embodiments as disclosed herein) configured to receive automation data 404 that is associated with the operations of the automation pipeline 202. In some embodiments, the RPA optimizer 402 may include one or more RPA monitoring engines 436 that may include logic to implement and/or otherwise facilitate the RPA pipeline monitoring features disclosed herein. In various embodiments, for example, the RPA optimizer 402 (e.g., based at least in part on the monitoring using the one or more monitoring engines 436) may receive automation data 404 via one or more network interfaces of the infrastructure 100, which automation data 404 the RPA optimizer 402 may analyze to provide for the unit of automation develop and deployment acceleration features disclosed herein. In various embodiments, the RPA optimizer 402 may receive automation data 404 by way of one or a combination of API calls, push operations, pull operations, polling operations, listening to one or more communication buses, and/or the like. In some embodiments, the one or more RPA monitoring engines 436 may use one or more RPA pipeline deployment agents to implement and/or otherwise facilitate the pipeline monitoring features.

Additionally or alternatively, the RPA optimizer 402 may include one or more RPA learning engines 438 that may include logic to implement and/or otherwise facilitate the RPA pipeline learning features disclosed herein. An RPA learning engine 438 may be an analysis engine configured to determine any suitable aspects pertaining to aspects of identification, learning, and recognition of how to accelerate unit of automations based at least in part on the automation data 404 received and processed by the one or more RPA monitoring engines 436. The one or more RPA learning engines 438 may include logic to implement and/or otherwise facilitate any classification, categorization, correlation, mapping, qualifying, scoring, orchestration, and/or the like features disclosed herein. In various embodiments, the learning engine 438 may be configured to analyze, classify, categorize, characterize, tag, and/or annotate data corresponding to the automation data 404 and associated unit of automations. The one or more RPA learning engines 438 may employ one or more artificial intelligence (machine learning or, more specifically, deep learning) algorithms to perform pattern matching to detect patterns of metrics of the automation data 404 and associated unit of automations. In some embodiments, the one or more RPA monitoring engines 436 and/or one or more RPA learning engines 438 may facilitate one or more learning/training modes. Accordingly, the learning engine 438 may facilitate machine learning or, more specifically, deep learning, to facilitate creation, development, and/or use of pattern data regarding the automation data 404 and associated unit of automation and software changes.

Disclosed embodiments may provide for identification, learning, and recognition of how to accelerate development and deployment of units of automation, for example, using one or more RPA learning engines 438. In various embodiments, for example, the RPA optimizer 402 (e.g., using the one or more RPA learning engines 438) may learn one or a combination of rules 457 defining mappings of automation composites 459 to requirements pertaining to automation development operations of the automation pipeline, corresponding automation development protocols, automation composites 459, corresponding parameter values, constraints, and/or the like to accelerate and adjust pipeline operations in order to create, process, progress, and otherwise facilitate unit of automation development and deployment based on decreased developer input.

Additionally or alternatively, the RPA optimizer 402 may include one or more RPA acceleration engines 440 that may include logic to implement and/or otherwise facilitate the automation pipeline acceleration and operational adjustment features disclosed herein. In various embodiments, for example, the RPA optimizer 402 (e.g., using the one or more acceleration engines 440) may be configured to cause the one or more adjustments 482 disclosed herein. In some embodiments, the acceleration engine 440 may analyze input monitored by the monitoring engine 436, determinations of the learning engine 438, and/or information stored in one or more data storage repositories 414 to make adjustment 482 determinations. Based at least in part on one or more adjustment 482 determinations, the acceleration engine 440 may cause activation of one or more adjustment 482 operations. By way of example, in various embodiments, the adjustments 482 may include one or a combination of: unit of automation creation 482-1; unit of automation updates 482-2, which may include progression and rollback operations of an unit of automation through the pipeline; automation composite generation 482-3; detection-triggered notifications 482-4, which may facilitate pipeline flow operations and/or prompting of developers to take actions; security protocol enforcement 482-5, which may include enforcement of compliance operations and/or constraints to satisfy compliance requirements; and/or the like adjustment features disclosed herein.

With disclosed embodiments, the automation data 404 may include input 406 from one or more developers, automation pipeline operations data 408, and/or software repository system input 410. As part of the RPA pipeline monitoring, the RPA monitoring engine 436 may monitor operations of the RPA deployment pipeline for testing and deploying units of automation to production computing services. The operations may correspond at least in part to one or more sets of input requirements for the development, testing, and deployment of units of automation. As units of automation move through the automation pipeline 202, bot creation and updates may be made by the subsystem 400 in an automated way. The updates may include updating what state a particular unit of automation is in, updating timestamps, updating activity logs (e.g., in data storage 414), and/or the like. The monitoring engine 436 may access any suitable pipeline information. For example, when a button is selected, pertinent information may be captured from the pipeline. The information may be collected at any suitable time, including, for example, when a kickoff trigger of cutting a tag in the software repository system 103 is detected, so the monitoring may take a snapshot of the pipeline configuration at that moment when the pipeline kickoff is triggered.

The input 406 may, for example, correspond to selections and other input provided by developers via interface elements of the client computing devices 102. In some embodiments, the user input 406 may include source code directly provided by the developers, instead of, or in addition to, receiving source code from a software repository system. For example, the input 406 may correspond to minimized input that is made possible by the learning features (which may include machine learning in some embodiments) of the subsystem 400. The input 406 may be inspected by the RPA optimizer 402, along with pipeline operations data 408 (e.g., data and metadata that may be generated and/or collected by the pipeline automation on-the-fly for every deployment, tag data for the various versions of code released, and/or the like). The software repository system input 410 may correspond to input received from the one or more software repository systems 103, such as source code 245, automation pipeline history information 250, and/or the like, that may be received via one or more data acquisition interfaces of the pipeline infrastructure 100.

Figure 5:
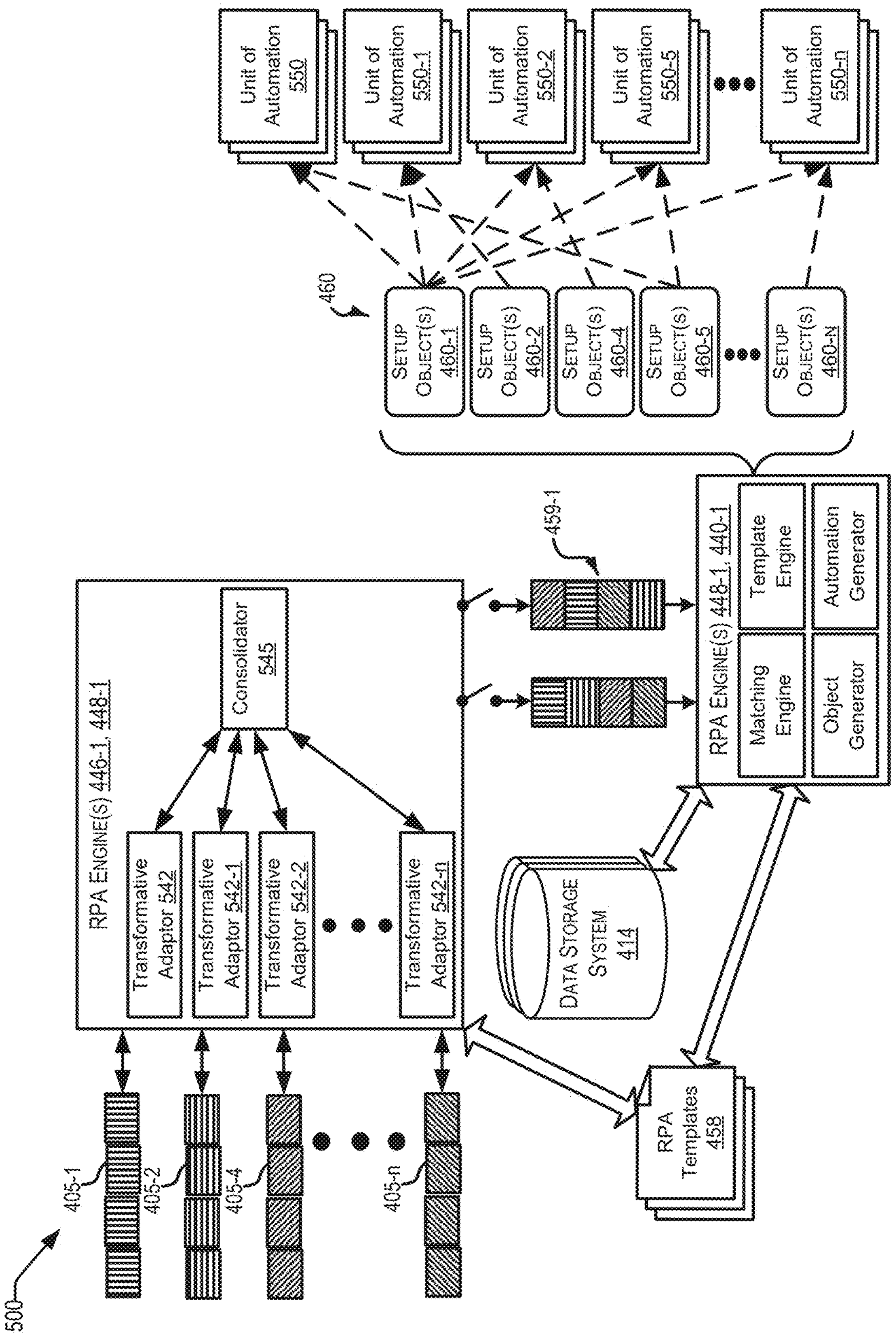
FIG. 5 illustrates a diagram of certain aspects of RPA optimization by the subsystem, in accordance with embodiments according to the present disclosure.

In some embodiments, based at least in part on the automation data 404, units of automation may be constructed automatically by the subsystem 400. In some embodiments, the learning engine 438 may learn from the automation data 404 corresponding to unit of automation processes as units of automation and software changes flow through the pipeline, making inferences from such monitored processes and corresponding input. FIG. 5 depicts a diagram 500 of certain aspects of RPA optimization by the subsystem 400, in accordance with embodiments according to the present disclosure. The RPA optimizer 402 (e.g., using RPA monitoring engine 436-1) may receive and process the automation data 404 (e.g., 404-1, 404-2, 404-3, . . . 404-*n*). The RPA monitoring engine(s) 436-1 and/or the RPA learning engine(s) 438-1 may monitor, parse, evaluate, transform, translate, or otherwise adjust data and code collected. In some embodiments, the RPA monitoring engine(s) 436-1 and/or the RPA learning engine(s) 438-1 may include one or more transformative adaptors 532. In some embodiments, one or more transformative adaptors 532 may be associated with the content acquisition interfaces to effect the transformations. The transformative adaptors 532 may be implemented, in various embodiments, in hardware and/or software that transforms, translates, converts, or otherwise adjusts the automation data 404. In some embodiments, the automation data 404 acquired may be in different formats, according to different data standards, in different data structures, including different types of data, etc. The automation data 404 may then be transformed, translated, or otherwise adjusted by the RPA monitoring engine(s) 436-1 and/or the RPA learning engine(s) 438-1. For example, acquired data may be converted from a first format to a second format using one or more conversion rules, which may be user-defined, heuristic, and/or machine-learned.

In some embodiments, various processors and/or layers within the RPA optimizer 402 may be specialized to perform various types of tasks. For example, a first set of processors may be configured to transform the automation data 404 within a stream in real-time (e.g., to produce data in a standard format and/or one that corresponds to a protocol) and detect (e.g., based at least in part on data included in a header of a data element) whether the transformed data includes one or more particular types of data. In various embodiments, the first set of processors may utilize the transformative adaptors 532 to effect the transformation and/or may further transform the data beyond first-stage transformations by the transformative adaptors 532.

In some embodiments, the RPA monitoring engine(s) 436-1 may process manifold data sets that may, for instance, come from different sources or the same source, for example, by way of one or more updates to data previously provided by a particular source, and a consolidator 535 of the RPA monitoring engine(s) 436-1 and/or the RPA learning engine(s) 438-1 may consolidate the data sets. The consolidation may include applying one or more filtering techniques (or one or more filters) to the data sets, organizing, categorizing, qualifying, and/or comparing the sets of information; detecting, identifying, and/or handling errors/inconsistencies; identifying redundancies; removing redundancies; discarding data irrelevant to composite or setup object building; and/or otherwise processing the data sets. The consolidator 535 may determine whether each element includes a data pattern and/or code configuration that may be consistent with one or more defined protocols. A protocol may define a data pattern and/or code configuration as one that includes, for example, one or more particular data elements and/or types of data elements, and/or code that provides a particular function. The RPA learning engine(s) 438-1 may use the processed automation data 404 to generate automation data composites 459-1.

Referring again to FIG. 4, based at least in part on the monitoring and the automation data 404 received, the learning engine 438 may create automation data composites 459 ("automation composites 459") in some embodiments. Each automation composite 459 may correspond to a data structure that includes at least some automation data 404, which may include code, associated with one or more operations of the deployment pipeline learned by the learning engine 438 as correlated to components that make up units of automation. In some embodiments, the RPA monitoring engine 436 may collect, aggregate, and consolidate at least some of the automation data 404 and develop automation history data 455. The RPA optimizer 402 (e.g., using the RPA learning engine 438 and/or the RPA acceleration engine 440) may create the automation composites 459 based at least in part on the automation history data 455. The automation composites 459 may include one or combination of metadata, objects, fields, parameters, code, references, locators, and/or the like. In some embodiments, the learning engine 438 may learn different unit of automation types and corresponding attributes of the different types. The learning engine 438 may generate and store specifications of the different unit of automation types and corresponding attributes in a table, index, key-value data structure, and/or the like in a categories data storage 412. The learning engine 438 may store automation composites 459 in data storage 414 (e.g., linked with a table, index, key-value data structure, and/or the like).

In some embodiments, the automation history data 455 may be used by the RPA optimizer subsystem 400 to enhance the efficiency, accuracy, and adaptability of RPA processes with the generation of automation data composites 459, RPA templates 458, and setup objects 460. The RPA optimizer 402 may use the automation history data 225 to recognize patterns of pipeline operations, state tracking, and the lifecycle of automation units through the pipeline. The RPA optimizer 402 may automatically update timestamps, approvals, and activity logs (e.g., in data storage 414) based on historical patterns. For example, if a unit has previously required manual approval at a specific stage, the system can flag that step for analysis in future deployments. With respect to state management, by analyzing historical states (e.g., success, failure, rollback), the RPA optimizer 402 may dynamically adjust the current state of automation units, ensuring consistency and reducing manual intervention. The RPA learning engine 438 may analyze the automation history data 455 to identify recurring patterns, such as successful deployment configurations, common failure points, or optimal parameter values.

These subsystem-learned insights may be used by the RPA learning engine 438 to create/develop the rules 457 (e.g., mappings between automation composites 459 and development protocols) that guide future automation creation and updates, for example, with the templates 458. Based at least in part on the automation composites 459, the RPA learning engine 438 may learn rules 457 corresponding to one or more automation development protocols. The rules 457 may define mappings of the automation composites 459 to requirements pertaining to automation development operations of the automation pipeline. A plurality of pipeline data fields may be associated with each unit of automation. Each of the data fields may be associated with one or more input attributes. The input attributes may specify input requirements for each data field. The mappings may specify (e.g., with the input attributes) which automation composites 459 and which user inputs 406 are for which data fields of a unit of automation. The rules 457 may further differentiate (e.g., with the input attributes) which fields are subsystem-populated with automation composites 459 from which fields require user input 406. As disclosed herein, the learning engine 438, by way of its learning features, may decrease the input required for units of automation over time. In so doing, the subsystem 400 may select a subset of input attributes from the plurality of input attributes in order to define which data fields are still requiring user input 406. Thus, over time, a decreased subset of input attributes may be associated with fields that still require user input 406.

In some embodiments, the RPA learning engine 438 may analyze the automation history data 455 of automation composites 459 to create/develop the rules 457 to define constraints (e.g., compliance requirements, security checks) that are automatically enforced during new deployments, minimizing errors and ensuring adherence to protocols. Such constraints may be incorporated into the templates 458 and the configuration of setup objects 460. Thus, based at least in part on the rules 457 and the requirements, the RPA optimizer 402 may create and/or develop RPA templates 458. In some embodiments, an RPA template 458 may correspond to an initialization file. The RPA template 458 may specify input that may be required from the developer to create the unit of automation. The RPA templates 458 may include the rules and requirements. In some embodiments, the rules 457 may define formatting for the population of the various fields, conversions the user input 406 into the format and form required by the fields, rules for validation of the user input 406, rules for validation of automation composites 459 that are learned by the subsystem 400, and/or the like. The RPA optimizer 402 may configure the RPA templates 458 with the rules 457. Accordingly, the RPA optimizer 402 may use the automation history data 455 for learning and rule 457 generation, pattern recognition, and constraint enforcement with the RPA templates 458, among other things.

Referring again to the flow of FIG. 5, in some embodiments, having formed the automation composites 459-1 (using, in some embodiments, one or more first-stage processors), the automation composites 459-1 may be used by the RPA monitoring engine(s) 436-1 and/or the RPA learning engine(s) 438-1 (using, in some embodiments, one or more second-stage processors) to generate the RPA templates 458 and the setup objects 460. Accordingly, the RPA monitoring engine(s) 436-1 and/or the RPA learning engine(s) 438-1 may correspond at least partially to a matching engine, a template engine, and/or an object generator that may build particularized RPA templates 458 and setup objects 460. Further, the RPA monitoring engine(s) 436-1 and/or the RPA learning engine(s) 438-1 may retrieve from the data storage system 414 previously generated RPA templates 458 and setup objects 460 to update (based at least in part on newly generated automation composites 459-1) and/or reuse the RPA templates 458 and setup objects 460 to facilitate configuration of units of automation 550.

Referring again to FIG. 4, based at least in part on the RPA templates 458 and input 406 received responsive to the RPA templates 458, the RPA optimizer 402 may generate the setup objects 460 to facilitate setup of the units of automation. The RPA optimizer 402 may store the setup objects 460 in association with the automation pipeline, facilitating development of the units of automation. The setup objects 460 may correspond at least in part to the automation composites 459. In some embodiments, the setup objects 460 may be populated at least in part with the automation composites 459. In various embodiments, the acceleration engine 440 may use underlying tables and/or the RPA templates 458 that the acceleration engine 440 may populate with automation composites 459 (at least in part, for example, with metadata, parameters, objects, and/or the like data of the automation composites 459) and structure according to the rules 457. Accordingly, the acceleration engine 440 may assign particular automation composites 459 to the unit of automation structure for various different types of units of automation that may be initiated by developers with various sets of input. The RPA optimizer 402 may expose the RPA templates 458 in any suitable form (e.g., spreadsheet, document, any suitable graphical user interface, etc.) and receive user input 406 responsive to the RPA templates 458 via a user interface of the automation pipeline. The RPA optimizer 402 may provide an API to validate, accept, and/or reject the parameters entered by the user. The RPA optimizer 402 may validate that the received input 406 conforms to a subset of a set of input requirements corresponding to the rules 457.

In some embodiments, utilizing the user input 406 provided responsive to one or more RPA templates 458 for a particular unit of automation instance, the acceleration engine 440 may generate a unit of automation structure with one or more of the setup objects 460 and generate the remaining parameters based at least in part on the automation composites 459 and the rules 457. In some embodiments, for a particular set of input for a unit of automation, the acceleration engine 440 may match the particular set of input to attributes of for a particular type of unit of automation, using the categories data storage 412, which may include mappings of automation composites 459. Mappings of automation composites 459 may be defined by the learning engine 438 and/or the acceleration engine 440 for various types of units of automation. The acceleration engine 438 may make use of learned default values particularized to the unit of automation type to create the setup objects 460 for a unit of automation structure. The unit of automation may be configured in accordance with the one or more unit of automation protocols, using the populated setup objects 460.

In some embodiments, the RPA learning engine 438 may use the automation history data 455 for predictive analytics and proactive interventions, for example, via the rules 457, the templates 458, and the setup objects 460. For example, the RPA learning engine 438 may use the automation history data 455 for failure prediction, predicting potential issues (e.g., deployment failures, compliance violations) based on past trends. The RPA optimizer 402 may then proactively adjust the rules 457, the templates 458, and the setup objects 460 to mitigate risks. Thus, the RPA optimizer 402 may use the automation history data 455 for automated updates and documentation. This may include the RPA optimizer 402 self-updating the rules 457, the templates 458, and the setup objects 460. The RPA optimizer 402 may use the automation history data 455 to automatically update the rules 457, the templates 458, the setup objects 460, and/or the automation units (e.g., correcting parameters, fixing errors) based on previously successful configurations, reducing the need for manual input. The automation history data 455 may be stored in data storage 414 and may be used by the RPA optimizer 402 to continuously improve pipeline performance, decrease developer input, and improve deployment outcomes.

In some embodiments, the RPA optimizer 402 may use the automation history data 455 for contextual notifications. This may include the RPA optimizer 402 using the automation history data 455 to trigger detection-triggered notifications (e.g., alerting developers of recurring issues or suggesting fixes based on past solutions). By analyzing historical success factors, the RPA optimizer 402 may recommend configurations with the templates 458 and/or the setup objects 460 to developers, streamlining the automation creation process. By analyzing automation history data 455 from parallel deployments (e.g., A/B testing) the RPA optimizer 402 may inform decisions on which automation strategies yield the best outcomes (e.g., speed, accuracy). Accordingly, the RPA optimizer 402 may use the automation history data 455 as part of a feedback loop for the RPA optimizer subsystem 400, enabling continuous learning, adaptive adjustments, and proactive risk mitigation. By leveraging historical patterns, the RPA optimizer 402 may reduce manual effort, enhance compliance, and optimize processes, ultimately improving the reliability and efficiency of RPA processes.

In some embodiments, the RPA acceleration engine 440 may use the automation history data 455 to determine when to trigger rollbacks or progress automation units through the pipeline. For instance, if a unit historically failed at a specific test phase, the RPA optimizer 402 may automatically initiate a rollback or suggest alternative configurations. Moreover, by analyzing historical bottlenecks or delays, the RPA optimizer 402 may optimize pipeline steps (e.g., adjusting resource allocation) to reduce deployment times and improve throughput. Accordingly, the RPA optimizer 402 may use the automation history data 455 for acceleration, adaptive adjustments, automated rollbacks and progression, and dynamic pipeline optimization. Moreover, by identifying historical resource usage patterns, the RPA optimizer 402 may predict demand and allocate computing resources (e.g., server capacity, testing environments) dynamically during automation processes. The RPA optimizer 402 may use the automation history data 455 for security and compliance enforcement, enforcing security and compliance protocols. For example, if historical data reveals vulnerabilities in certain deployment steps, the RPA optimizer 402 may automatically apply stricter checks or block non-compliant configurations.

In some examples, some embodiments may include creating a unit of automation corresponding to an automated resource allocation processing bot, designed for streamlining and automating an end-to-end resource allocation process for users of services provided by the infrastructure 100. Such a bot may leverage components of the subsystem 400 to create a self-optimizing, compliance-driven automation solution. The bot may, for example, integrate with the core systems via API to analyze documents, capture data from user screens, transfer resources, generate reports, and notify users, while routing flagged data instances thereof for manual analysis. The RPA optimizer 402 may integrate with other components of the infrastructure to expose RPA templates 458 for user input, while storing setup objects 460 for bot creation and automation history data 455 for continuous learning and optimization. The RPA learning engine 438 may generate rules 457 for validation and may create RPA templates 458 for user input. The setup objects 460 may be populated with default configurations for the bot, including integrations with core resource allocation systems and external remote data source systems. The RPA acceleration engine 440 may utilize automation composites 459—created in real time and/or reused for configuration of the bot for tasks such as OCR-based data extraction from user-exposed screens—and may apply rules 457 in real time to enforce compliance with compliance requirements. For instance, the RPA Optimizer 402 may dynamically apply rules 457 such as software change request verification to ensure that all required fields are completed. The data storage system 414 may store automation history data 455, enabling the RPA learning engine 438 to analyze historical units of automation, automated tasks, and automation configuration to refine rules 457 and setup objects 460 to improve accuracy and reduce manual interventions. For example, if a specific automation type shows high errors rates, the subsystem 400 may update rules 457 to prioritize testing of corresponding automated tasks. The system's continuous learning and adaptation mechanism may ensure real-time updates to rules 457, RPA templates 458, and setup objects 460 based on historical success factors, enabling proactive error mitigation, compliance enforcement, and self-optimization. By reusing automation composites 459, RPA templates 458, and setup objects 460, the bot eliminates redundant processing, accelerates deployment, and ensures consistency across similar automation tasks, such as processing resource allocation requests or reports. This implementation may exemplify how the subsystem's integration of machine learning, predictive analytics, and adaptive rule generation transforms RPA development into a scalable, secure, and efficient solution for the infrastructure 100, reducing manual intervention through expedited application processing.

Accordingly, the subsystem 400 may include the RPA optimizer 402 designed for automating, enhancing, and continuously improving the development and execution of RPA. The components of the RPA optimizer 402 (e.g., RPA monitoring engine 436, RPA learning engine 438, RPA acceleration engine 440) may each be configured to work in concert to streamline automation processes and ensure adaptability. The RPA optimizer 402 may validate user input against predefined rules and integrate with other modules to expose RPA templates 458 for user interaction. The RPA optimizer 402 may generate, develop, store, and reuse setup objects 460 and automation history data 455 for continuous learning and optimization. The RPA learning engine 436 may analyze automation history data 455 to generate rules 457 for validation, formatting, and constraint enforcement, as well as to create RPA templates 458 and setup objects 460. By leveraging historical automation, the learning engine 436 may predict potential failures, compliance issues, and process inefficiencies, dynamically updating rules, templates, and setup objects based on feedback. The RPA acceleration engine 440 may utilize automation composites 459 and rules 457 to generate units of automation 450 by populating setup objects 460 with default bot configurations and values, consequent to matching user input to automation types via categories data storage 412. The ability of the subsystem 400 to reuse previously created automation composites, RPA templates, and setup objects to generate new units of automation may also eliminate redundant processing and accelerate automation creation. This reuse may be facilitated by the data storage system, which maintains a repository of existing composites, templates, and setup objects, enabling the acceleration engine to leverage these pre-validated and optimized components for subsequent automation tasks. The data storage system may house automation history data 455, rules 457, templates 458, and setup objects 460, enabling historical analysis, predictive modeling, and self-updating systems. The RPA optimizer 402 may employ automation composite formation, where first-stage processors transform raw data into automation composites 459, encapsulating, for example, metadata, parameters, and objects for specific tasks. Second-stage processors then generate RPA templates 458 and setup objects 460 from automation composites. User input may be validated against the rules 457, with valid inputs triggering setup object population and automation unit configuration. The subsystem's continuous learning and adaptation mechanism may analyze historical data to predict deployment failures, compliance violations, and bottlenecks, updating rules and templates dynamically. The subsystem's ability to learn from historical data and adapt in real-time, combined with its efficient reuse of existing automation components, represents a significant advancement in RPA ecosystems, addressing prior limitations in automation efficiency, error reduction, and dynamic scalability.

Thus, the disclosed system, which may include subsystem 400, incorporates several unconventional and technically significant features that materially improve computer functionality in the domain of robotic process automation. Unlike traditional RPA platforms that rely on static templates and require extensive manual configuration, disclosed embodiments may dynamically reduce manual user input over time through adaptive learning mechanisms embedded within the RPA optimizer subsystem. Specifically, the machine learning engine may continuously analyze historical automation pipeline data—including deployment outcomes, error rates, and compliance incidents—to refine and update rule sets, templates, and setup objects in real time. This adaptive approach may enable the system to proactively predict and mitigate deployment failures, compliance risks, and bottlenecks by automatically adjusting configuration parameters, resource allocations, and validation protocols before errors occur. Additionally, the system may leverage a centralized repository of previously generated automation composites and templates, allowing for their efficient reuse across multiple automation tasks and projects. This capability may eliminate redundant processing, streamline the development process flow, and ensure consistency in automation implementation. Furthermore, the system's ability to dynamically allocate computing resources (such as server capacity and testing environments) in response to real-time pipeline metrics represents a substantial improvement over conventional resource provisioning methods. By integrating predictive analytics, adaptive rule generation, and automated resource management, disclosed embodiments may transform the RPA pipeline into a self-optimizing, scalable, and resilient platform that enhances reliability, reduces developer workload, and achieves superior operational efficiency—capabilities not found in conventional RPA systems.

Figure 6:
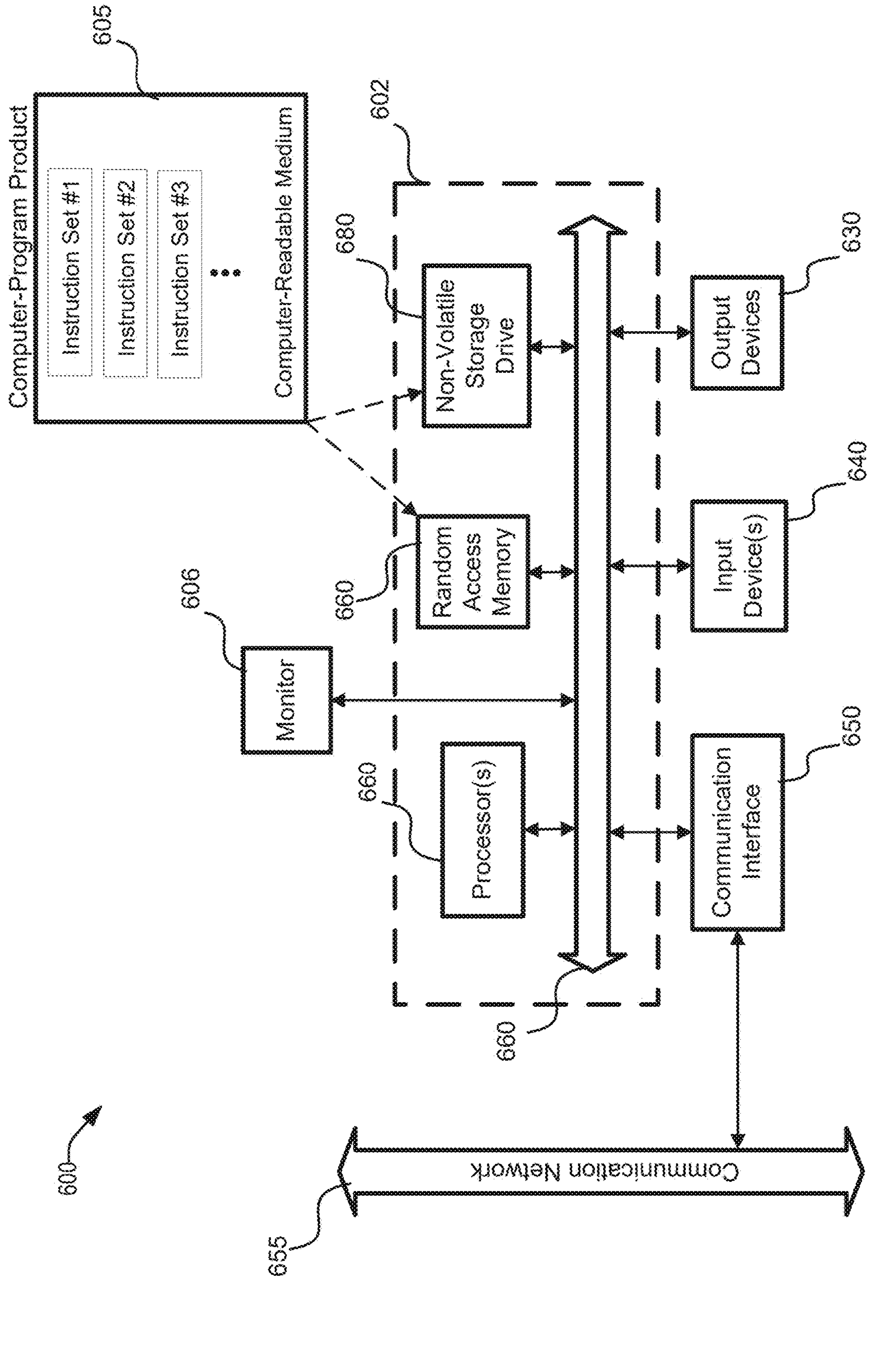
FIG. 6 illustrates a special-purpose computer system, in accordance with embodiments according to the present disclosure.

With reference to FIG. 6, an embodiment of a special-purpose computer system 600 is shown. The above methods may be implemented by computer-program products that direct a computer system to perform the actions of the above-described methods and operations. In various embodiments, the special-purpose computer system 600 may at least partially implement the subsystem 200. In various embodiments, the computer system 600 may correspond at least in part to one or more of the RPA optimizer 402, the client computing devices 102, the server system 130, the cloud infrastructure system 130-1, and/or the remote system 140. Each such computer program may comprise sets of instructions (codes) embodied on a computer-readable medium that directs the processor of a computer system to perform corresponding actions. The instructions may be configured to run in sequential order, or in parallel (such as under different processing threads), or in a combination thereof. Merely by way of example, one or more procedures described with respect to the method(s) discussed herein might be implemented as code and/or instructions executable by a computer (and/or a processor within a computer); in an aspect, then, such code and/or instructions can be used to configure and/or adapt a general purpose computer (or other device) to perform one or more operations in accordance with the described methods, transforming the computer into the special-purpose computer system 600.

As discussed further herein, according to a set of embodiments, some or all of the procedures of such methods are performed by the computer system 600 in response to processor-execution of one or more sequences of one or more instructions (which might be incorporated into the operating system and/or other code, such as an application program) contained in the operating memory. Such instructions may be read into the operating memory from another computer-readable medium, such as one or more of the non-transitory storage device(s). Merely by way of example, execution of the sequences of instructions contained in the operating memory might cause the processor(s) to perform one or more procedures of the methods described herein.

Special-purpose computer system 600 may include a computer 602, a monitor 606 coupled to computer 602, one or more additional user output devices 630 (optional) coupled to computer 602, one or more user input devices 640 (e.g., joystick, keyboard, mouse, track ball, touch screen buttons, switches, control handles, and/or the like) coupled to computer 602, a communications interface 650 coupled to computer 602, a computer program 605 stored in a tangible computer-readable memory in computer 602. Computer program 605 directs system 600 to perform the above-described methods. Computer 602 may include one or more processors 660 that communicate with a number of peripheral devices via a bus subsystem 690. These peripheral devices may include user output device(s) 630, user input device(s) 640, communications interface 650, and a storage subsystem, such as random-access memory (RAM) 670 and non-volatile storage drive 680 (e.g., disk drive, optical drive, solid state drive), which are forms of tangible computer-readable memory.

Computer program 605 may be stored in non-volatile storage drive 680 or another computer-readable medium accessible to computer 602 and loaded into memory 670. Each processor 660 may comprise a microprocessor, such as a microprocessor from Intel® or Advanced Micro Devices, Inc.®, or the like. To support computer program 605, the computer 602 runs an operating system that handles the communications of 605 with the above-disclosed components, as well as the communications between the above-disclosed components in support of the computer program 605. Exemplary operating systems include Windows® or the like from Microsoft® Corporation, Solaris® from Oracle®, LINUX, UNIX, and the like. The processors 660 may include one or more special-purpose processors such as digital signal processing chips, graphics acceleration processors, video decoders, image processors, and/or the like.

User input devices 640 include all possible types of devices and mechanisms to input information to computer system 602. These may include a keyboard, a keypad, a mouse, a scanner, buttons, control handles, switches, a digital drawing pad, a touch screen incorporated into the display, audio input devices such as voice recognition systems, microphones, and other types of input devices. In various embodiments, user input devices 640 may be embodied as a computer mouse, a trackball, a track pad, a joystick, buttons, control handles, switches, wireless remote, a drawing tablet, a voice command system. User input devices 640 typically allow a user to select objects, icons, text and the like that appear on the monitor 606 via a command such as a click of a button or the like. User output devices 630 include all possible types of devices and mechanisms to output information from computer 602. These may include a display (e.g., monitor 606), printers, non-visual displays such as audio output devices, etc. Some embodiments may not have a separate monitor 606, but may have the monitors integrated with input devices and/or output devices, such as mobile devices, touchscreen devices, etc.

Communications interface 650 provides an interface to other communication networks 655 and devices and may serve as an interface to receive data from and transmit data to other systems, WANs and/or the Internet. Embodiments of communications interface 650 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 650 may be coupled to a computer network, to a FireWire® bus, or the like. In other embodiments, communications interface 650 may be physically integrated on the motherboard of computer 602, and/or may be a software program, or the like. In further examples, the communications interface 650 may be part of a communications subsystem, which can include without limitation a modem, a network card (wireless or wired), an infrared communication device, a wireless communication device, and/or a chipset (such as a Bluetooth™ device, BLE, an 802.11 device, an 802.15.4 device, a Wi-Fi device, a WiMAX device, cellular communication device, etc.), and/or the like. The communications subsystem may permit data to be exchanged with a network (such as the network described below, to name one example), other computer systems, and/or any other devices described herein.

RAM 670 and non-volatile storage drive 680 are examples of tangible computer-readable media configured to store data such as computer-program embodiments, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 670 and non-volatile storage drive 680 may be configured to store the basic programming and data constructs that provide the functionality of various embodiments, as described above. The above are examples of one or more non-transitory storage devices that may be utilized by the system 600. Such storage devices may be configured to implement any appropriate data stores, including without limitation, various file systems, database structures, and/or the like.

Software instruction sets that provide the functionality of disclosed embodiments may be stored in RAM 670 and non-volatile storage drive 680. These instruction sets or code may be executed by the processor(s) 660. RAM 670 and non-volatile storage drive 680 may also provide a repository to store data and data structures used in accordance with disclosed embodiments. RAM 670 and non-volatile storage drive 680 may include a number of memories including a main random-access memory (RAM) to store of instructions and data during program execution and a read-only memory (ROM) in which fixed instructions are stored. RAM 670 and non-volatile storage drive 680 may include a file storage subsystem providing persistent (non-volatile) storage of program and/or data files. RAM 670 and non-volatile storage drive 680 may also include removable storage systems, such as removable flash memory. Bus subsystem 670 provides a mechanism to allow the various components and subsystems of computer 602 communicate with each other as intended. Although bus subsystem 670 is shown schematically as a single bus, alternative embodiments of the bus subsystem may utilize multiple busses or communication paths within the computer 602.

The above methods may be implemented by computer-program products that direct a computer system to control the actions of the above-described methods and components. Each such computer program may comprise sets of instructions (codes) embodied on a computer-readable medium that directs the processor of a computer system to cause corresponding actions. The instructions may be configured to run in sequential order, or in parallel (such as under different processing threads), or in a combination thereof. Special-purpose computer systems disclosed herein include a computer-program product(s) stored in tangible computer-readable memory that directs the systems to perform the above-described methods. The systems include one or more processors that communicate with a number of peripheral devices via a bus subsystem. These peripheral devices may include user output device(s), user input device(s), communications interface(s), and a storage subsystem, such as random-access memory (RAM) and non-volatile storage drive (e.g., disk drive, optical drive, solid state drive), which are forms of tangible computer-readable memory.

Accordingly, some embodiments according to the present disclosure may include a system designed to help evaluate the input-benefit of using RPA by analyzing factors such as setup resources, time savings, error reduction, and integration with existing tools such as databases, APIs, and legacy software systems. The system may calculate the financial and operational impact of automation across a range of scenarios, such as automating repetitive tasks in finance, operations, or end-user service, and comparing the upfront and ongoing resource needs of RPA implementation (e.g., software conditions, training, maintenance) with the potential savings from reduced manual labor, faster processing times, and fewer errors. Key features may include technical integration capabilities, such as seamless connections with external systems like databases or ERP platforms, and adaptability to future technologies, ensuring the system remains relevant even as RPA tools evolve. Use cases may include scenarios like loan processing in the banking sector, where the system helps estimate the resource needs of automating loan applications versus the savings from faster approvals and reduced human intervention; compliance checks in regulated industries, with RPA for data entry, report generation, and audit trails; and end-user service automation, where the system evaluates the resource needs of deploying chatbots or email response systems against the efficiency increases from handling high-volume inquiries. By focusing on the methodology—such as dynamic resource need modeling, automated process orchestration, or data validation techniques—embodiments may avoid over-reliance on specific RPA tools or bots, which are inherently ephemeral and prone to obsolescence. Embodiments may facilitate avoidance of resource-intensive automation efforts that may not deliver a measurable return on investment, offering a data-driven, transparent way to assess whether RPA is a viable solution in view of specific needs.

In the above description, for the purposes of explanation, numerous specific details were set forth in order to provide a thorough understanding of various embodiments. It will be apparent, however, to one skilled in the art that embodiments may be practiced without some of these specific details. In other instances, well-known structures and devices are shown in block diagram form.

The above description provides exemplary embodiments only, and is not intended to limit the scope, applicability, or configuration of the disclosure. Rather, the above description of the exemplary embodiments will provide those skilled in the art with an enabling description for implementing an exemplary embodiment. It should be understood that various changes may be made in the function and arrangement of elements without departing from the spirit and scope of disclosed embodiments as set forth in the appended claims.

Specific details are given in the above description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The terms "computer-readable medium," "computer-readable media," "processor-readable medium," "processor-readable media," "machine-readable medium," and "machine-readable media," include, but are not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

In the above specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system to facilitate robotic process automation acceleration, the system comprising:

one or more processing devices and memory communicatively coupled with and readable by the one or more processing devices, the memory comprising processor-readable instructions which, when executed by the one or more processing devices, cause the system to perform operations comprising:

receiving automation data via a network interface, wherein the automation data is associated with operations of an automation pipeline for developing and deploying one or more units of automation, which correspond to one or more robotic process automation (RPA) bots, to a computing infrastructure;

creating automation composites, where each of the automation composites comprises at least some of the automation data associated with the operations of the automation pipeline;

storing the automation composites in a data storage;

using the automation composites, machine-learning rules corresponding to one or more automation development protocols, including dynamically generating and updating the rules based on monitored operational data from one or more deployed RPA bots, the machine-learned rules defining mappings of the automation composites to requirements pertaining to automation development operations of the automation pipeline;

developing one or more templates based at least in part on the machine-learned rules to generate one or more customized templates, the one or more customized templates comprising one or more of the machine-learned rules and corresponding requirements; and generating a set of objects based at least in part on the one or more customized templates, the set of objects to facilitate setup of a unit of automation based at least in part on the machine-learning, wherein the set of objects is stored in association with the automation pipeline, facilitating development of the unit of automation.

2. The system to facilitate robotic process automation acceleration as recited in claim 1, the operations further comprising:

populating one or more data structures in the data storage with automation specifications specifying automation attributes corresponding to a plurality of automation types; and matching at least part of the automation data to a particular automation type of the plurality of automation types;

wherein the rules are at least partially a function of the particular automation type.

3. The system to facilitate robotic process automation acceleration as recited in claim 2, the operations further comprising configuring the one or more templates for the particular automation type.

4. The system to facilitate robotic process automation acceleration as recited in claim 1, wherein:

the one or more customized templates specify automation attributes determined based at least in part on the automation data and comprise pre-populated fields;

the creating is triggered automatically after a successful testing in an environment facilitated by the automation pipeline; and the operations further comprise creating the unit of automation based at least in part on the set of objects.

5. The system to facilitate robotic process automation acceleration as recited in claim 1, the operations further comprising monitoring, via the network interface, the operations of the automation pipeline, where the monitored operations correspond at least in part to a set of input requirements for the developing and the deploying of the one or more units of automation, and where the one or more units of automation correspond to one or more scripts for execution by one or more components of the computing infrastructure.

6. The system to facilitate robotic process automation acceleration as recited in claim 5, wherein the receiving the automation data via the network interface is based at least in part on the monitoring.

7. The system to facilitate robotic process automation acceleration as recited in claim 6, the operations further comprising analyzing the operations of the automation pipeline to identify the automation data associated with one or more of operations of the automation pipeline.

8. A method to facilitate robotic process automation acceleration, the method comprising:

receiving automation data via a network interface, wherein the automation data is associated with operations of an automation pipeline for developing and deploying one or more units of automation, which correspond to one or more robotic process automation (RPA) bots, to a computing infrastructure;

creating automation composites, where each of the automation composites comprises at least some of the automation data associated with the operations of the automation pipeline;

storing the automation composites in a data storage;

using the automation composites, machine-learning rules corresponding to one or more automation development protocols, including dynamically generating and updating the rules based on monitored operational data from one or more deployed RPA bots, the machine-learned rules defining mappings of the automation composites to requirements pertaining to automation development operations of the automation pipeline;

developing one or more templates based at least in part on the machine-learned rules to generate one or more customized templates, the one or more customized templates comprising one or more of the machine-learned rules and corresponding requirements; and generating a set of objects based at least in part on the one or more customized templates, the set of objects to facilitate setup of a unit of automation based at least in part on the machine-learning, wherein the set of objects is stored in association with the automation pipeline, facilitating development of the unit of automation.

9. The method to facilitate robotic process automation acceleration as recited in claim 8, further comprising:

populating one or more data structures in the data storage with automation specifications specifying automation attributes corresponding to a plurality of automation types; and matching at least part of the automation data to a particular automation type of the plurality of automation types;

wherein the rules are at least partially a function of the particular automation type.

10. The method to facilitate robotic process automation acceleration as recited in claim 9, further comprising configuring the one or more templates for the particular automation type.

11. The method to facilitate robotic process automation acceleration as recited in claim 8, wherein the one or more templates specify automation attributes determined based at least in part on the automation data.

12. The method to facilitate robotic process automation acceleration as recited in claim 8, further comprising monitoring, via the network interface, the operations of the automation pipeline, where the monitored operations correspond at least in part to a set of input requirements for the developing and the deploying of the one or more units of automation, and where the one or more units of automation correspond to one or more scripts for execution by one or more components of the computing infrastructure.

13. The method to facilitate robotic process automation acceleration as recited in claim 12, wherein the receiving the automation data via the network interface is based at least in part on the monitoring.

14. The method to facilitate robotic process automation acceleration as recited in claim 13, further comprising analyzing the operations of the automation pipeline to identify the automation data associated with one or more of the operations of the automation pipeline.

15. One or more non-transitory, machine-readable media having machine-readable instructions thereon which, when executed by one or more processing devices, cause a system to perform operations comprising:

receiving automation data via a network interface, wherein the automation data is associated with operations of an automation pipeline for developing and deploying one or more units of automation, which correspond to one or more robotic process automation (RPA) bots, to a computing infrastructure;

creating automation composites, where each of the automation composites comprises at least some of the automation data associated with the operations of the automation pipeline;

storing the automation composites in a data storage;

using the automation composites, machine-learning rules corresponding to one or more automation development protocols, including dynamically generating and updating the rules based on monitored operational data from one or more deployed RPA bots, the machine-learned rules defining mappings of the automation composites to requirements pertaining to automation development operations of the automation pipeline;

developing one or more templates based at least in part on the machine-learned rules to generate one or more customized templates, the one or more customized templates comprising one or more of the machine-learned rules and corresponding requirements; and generating a set of objects based at least in part on the one or more customized templates, the set of objects to facilitate setup of a unit of automation based at least in part on the machine-learning, wherein the set of objects is stored in association with the automation pipeline, facilitating development of the unit of automation.

16. The one or more non-transitory, machine-readable media as recited in claim 15, the operations further comprising:

populating one or more data structures in the data storage with automation specifications specifying automation attributes corresponding to a plurality of automation types; and matching at least part of the automation data to a particular automation type of the plurality of automation types;

wherein the rules are at least partially a function of the particular automation type.

17. The one or more non-transitory, machine-readable media as recited in claim 16, the operations further comprising configuring the one or more templates for the particular automation type.

18. The one or more non-transitory, machine-readable media as recited in claim 15, wherein the one or more templates specify automation attributes determined based at least in part on the automation data.

19. The one or more non-transitory, machine-readable media as recited in claim 15, the operations further comprising monitoring, via the network interface, the operations of the automation pipeline, where the monitored operations correspond at least in part to a set of input requirements for the developing and the deploying of the one or more units of automation, and where the one or more units of automation correspond to one or more scripts for execution by one or more components of the computing infrastructure.

20. The one or more non-transitory, machine-readable media as recited in claim 19, wherein the receiving the automation data via the network interface is based at least in part on the monitoring.

* * * * *